No. 880,664. PATENTED MAR. 3, 1908.
W. J. HILLIARD.
FRICTION CLUTCH.
APPLICATION FILED JAN. 15, 1907.
2 SHEETS—SHEET 1.
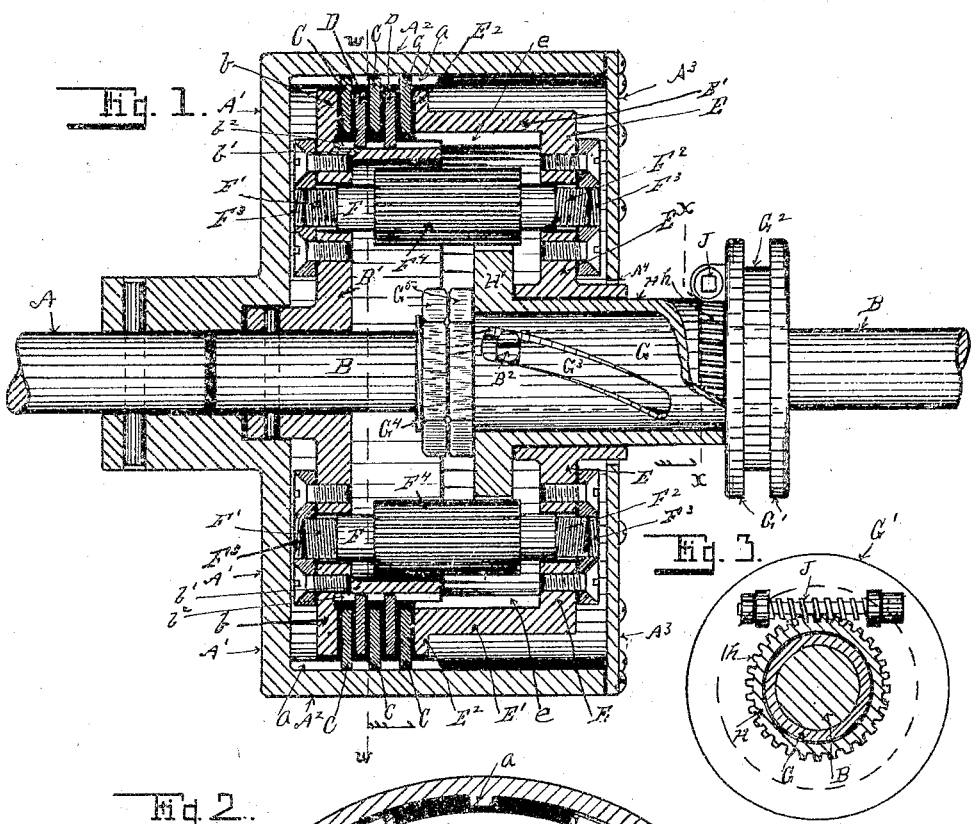
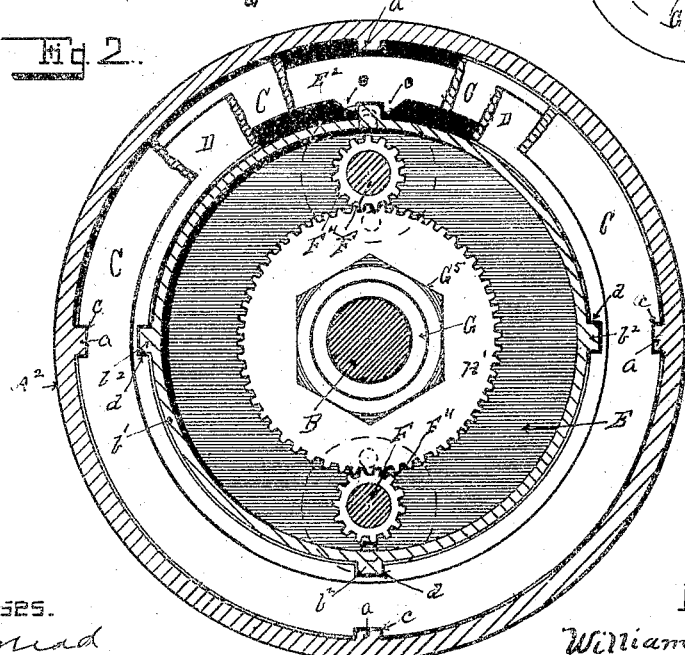
Witnesses.
G. J. Mead
Florence Stockert
Inventor.
William J. Hilliard
By J. C. Westington
his attorneys.

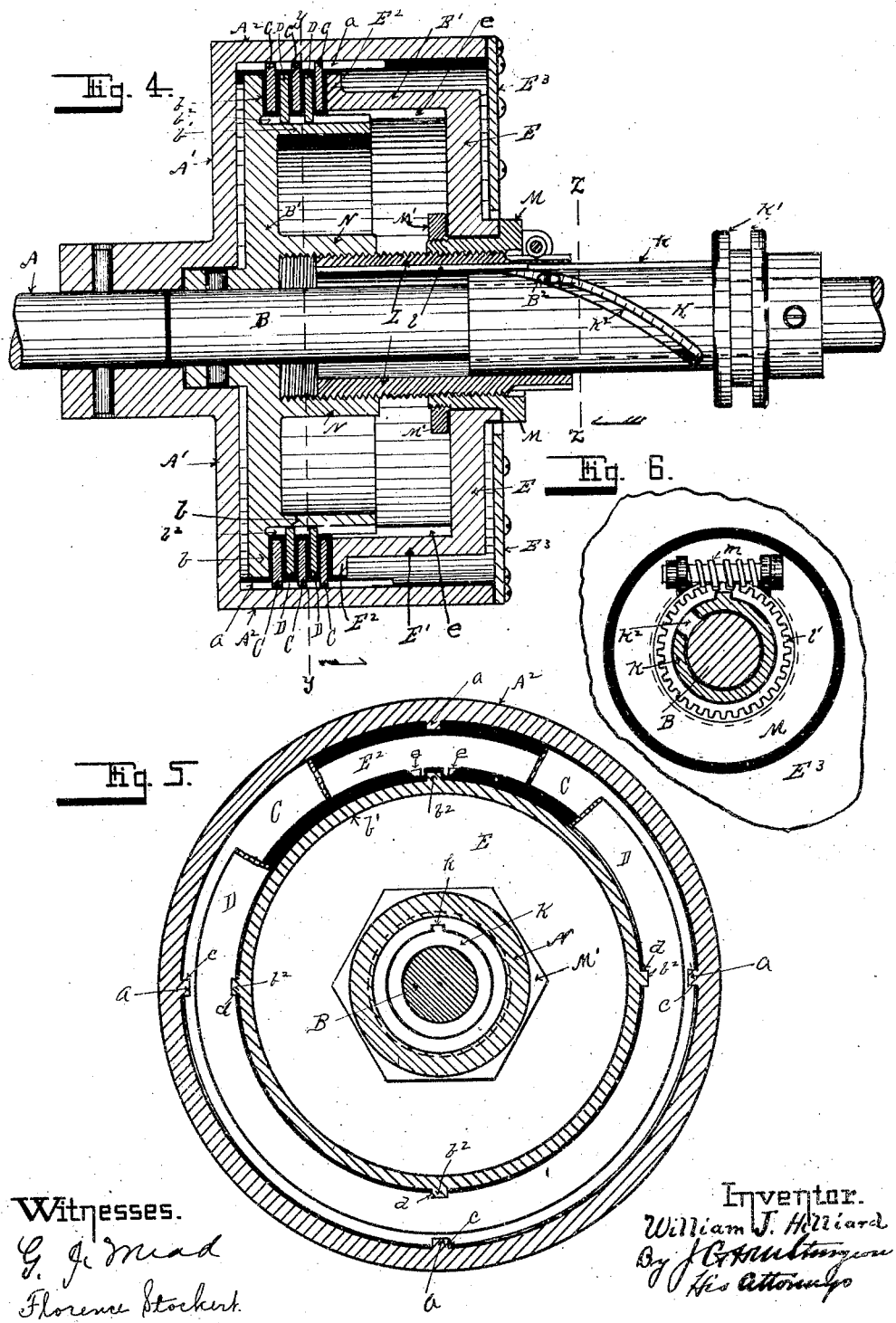

UNITED STATES PATENT OFFICE.

WILLIAM J. HILLIARD, OF ELMIRA, NEW YORK.

FRICTION-CLUTCH.

No. 880,664.   Specification of Letters Patent.   Patented March 3, 1908.

Application filed January 15, 1907. Serial No. 352,418.

*To all whom it may concern:*

Be it known that I, WILLIAM J. HILLIARD, a citizen of the United States, residing at Elmira, in the county of Chemung and State of New York, have invented certain new and useful Improvements in Friction-Clutches; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to friction clutches and has for its object the construction of a clutch which will maintain any degree of compression upon its friction surfaces between the minimum and maximum degrees thereof.

In friction clutches as heretofore constructed the clutching mechanism has to be operated to its maximum of movement in order to become fixed in that position, while in my invention hereinafter described, the clutching mechanism has only to be moved to a clutching position where it will remain until it is desired to tighten or loosen the same. These and other features of my invention are hereinafter more fully set forth and described, and are illustrated in the accompanying drawings in which:

Figure 1 is a longitudinal section of a clutch embodying my invention. Fig. 2 is a transverse section of the same on the line $w—w$ in Fig. 1. Fig. 3 is a section of the same on the line $x—x$ in Fig. 1 showing the adjusting mechanism. Fig. 4 is a longitudinal section of a clutch showing a modified construction of my invention. Fig. 5 is a transverse section of the same, on the line $y—y$ in Fig. 4. Fig. 6 is a section of the same on the line $z—z$ in Fig. 4, showing the adjusting mechanism thereof.

In these drawings A indicates the crank or drive shaft, and A' the clutch-case which is rigidly mounted on the shaft A and revolves therewith. The annular rim $A^2$ of the clutch-case A' extends outward on one side of the radial portion of the clutch-case A', and on the inside of said rim are one or more ribs $a$ for the purpose hereinafter set forth.

Upon the end of the to-be-driven shaft B inside of the rim $A^2$ of the clutch-case A' is rigidly secured a disk B' having a friction surface $b$ on one side thereof adjacent to its periphery. Adjacent to the inside edge of said friction surface $b$ on the disk B' is an annular shoulder or flange $b'$, and on the periphery of this annular shoulder $b'$ I place one or more ribs $b^2$ for the purpose hereinafter set forth. I then place within the rim $A^2$ of the clutch-case A' and adjacent to the friction surface $b$ of the disk B', a friction ring C having notches $c$ in the periphery thereof adapted to fit over the ribs $a$ on the inside of the clutch-case rim $A^2$. I then place another friction ring D upon the annular shoulder $b'$ upon the disk B', which ring D has notches $d$ in its inside edge adapted to fit over the ribs $b^2$ thereon. These rings C and D may be increased in number as may be desired, or they may all be omitted with the exception of the first ring C. The rings C, are, by means of the ribs $a$ on the inside of the clutch-case rim $A^2$ and the notches $c$ in the periphery of the said rings, caused to rotate by the rotation of the clutch-case A', while the rings D are held on the annular shoulder $b'$ against rotation thereon by means of the ribs $b^2$ on the periphery of said shoulder and the notches $d$ on the inside of said rings D.

Upon the to-be-driven shaft B I place two sleeves, one upon the other, which sleeves are hereinafter more definitely referred to and described. Upon these sleeves I mount a pressure disk E, which is provided with a flange E' on one side thereof, the edge of which is provided with a friction surface $E^2$. The inside diameter of the flange E' is sufficient to pass freely over the ribs $b^2$ on the annular shoulder $b'$ on the disk B'. Upon the inside periphery of the flange E' I provide shoulders $e\ e$ adapted to engage the ribs $b^2$ on the annular flange $b'$ of the disk B' so that the flange E' and disk E are caused to revolve in unison with the disk B' on the shaft B.

The open end of the clutch-case A' is preferably closed with a plate $A^3$ having a central opening $A^4$ therein for the purpose hereinafter set forth.

The several parts of the clutch embodying my invention hereinbefore described are common to both forms of my invention illustrated in the drawings accompanying this application. The distinctive features of the two forms are hereinafter fully described and pointed out as follows:

In Figs. 1 and 2 of the drawings the operating mechanism of the clutch consists of two or more shafts F provided on the ends with right hand screw threads F' and left hand screw threads F². These screw threads F' and F² operate in suitable nuts F³ (see Fig. 1 and in dotted lines in Fig. 2) said nuts F³ are secured to the disks B' and E by means of screws f (see Fig. 1) so that the ends of the shafts F between the screw-threaded ends thereof are mounted in bearings in said disks B and E. Upon the central portion of the shafts F are elongated pinions F⁴. Upon the shaft B in Figs. 1 and 2 I place a sleeve G having a collar G' on the outer end thereof, provided with the usual groove G². The inner end of the sleeve G is provided with a screw-thread G⁴ and nuts G⁵ to hold the sleeve G and the sleeve H hereinafter described in proper relation to each other. The sleeve G is provided with a spiral slot G³ in which the stud B² upon the shaft B operates.

Upon the sleeve G between the collar G' and the nuts G⁵ I mount a sleeve H having on its inner end a spur-gear H' which gear intermeshes with the pinions F⁴. The outer end of the sleeve H is provided with worm-teeth h (see Fig. 3) with which worm J which is mounted in suitable bearings on the collar G', intermeshes for the purpose of holding the sleeve H normally against rotation upon the sleeve G, and also for the purpose of adjusting the distance between the friction surfaces b and E² on the disk B and flange E'.

In operation when the sleeves G and H are forced inward on the shaft B they and the spur-gear H' are caused to rotate around the shaft B by the spiral slot G³ and stud B², which causes the pinions F⁴ and shafts F to rotate, which rotation causes the disks B' and E and their friction surfaces b and E² to approach each other and contact with the friction rings C and D, and press them together, which will cause the said clutch mechanism to rotate with the clutch-case A', thereby rotating the shaft B with the shaft A. In Figs. 3 and 4 this result is obtained by means of a single screw as follows: Upon the shaft B, I mount a sleeve K provided on its outer end with a grooved collar K', which sleeve K is provided with a spiral slot K² in which the stud B² secured to the shaft B operates, and upon the periphery of the sleeve K I provide a longitudinal spline k. Upon the sleeve K, I mount a sleeve L provided on its inner surface with a longitudinal groove l adapted to receive the spline k on the sleeve K. The outside of the sleeve L is provided with a screw thread approximately its entire length, there being worm-teeth l' cut in the extreme outer end of said sleeve. Upon the outer end of the sleeve L is secured an adjustable head M, upon which the disk E is rotatably mounted, and secured by means of the nut M'. The adjustable head M is secured against rotation upon the sleeve L by means of adjusting mechanism, consisting of a worm m mounted in suitable bearings on the outside of the adjustable head M, which worm m intermeshes with the worm teeth on the outer end of the sleeve L, (see Figs. 4 and 6) the operation of which is similar to the adjusting mechanism shown in Figs. 1 and 3.

The disk B' is provided with an internally screw-threaded socket N surrounding the shaft B, adapted to receive the screw-threaded sleeve L. In operation when the sleeve K is forced inward it causes the sleeve L to revolve around the shaft B and to screw into the socket N, thereby drawing the friction surfaces b and E² toward each other, as in the construction shown in Figs. 1 and 2.

From the foregoing description it is obvious that, while I preferably apply the power through the shaft A and clutch case A', it may with equal facility be applied through the shaft B and clutch mechanism.

It will also be seen that by means of the constructions herein shown and described I am enabled to produce a clutch which will become operative and fixed at any point of movement of the clutch operating mechanism, until it is desired to set the clutch tighter or loosen the same.

Having thus fully described my invention so as to enable others skilled in the art to construct and operate the same, what I claim as new and desire to secure by Letters-Patent, is:

1. The combination in a friction clutch, of a clutch member, a friction surface thereon, a second clutch member, a friction surface thereon, a longitudinally movable section on said second clutch member, a friction surface thereon, screw mechanism for moving said sections of the second member toward and away from the friction surface on the first named clutch member, and a sleeve rotatable with the shaft and non-rotatable with relation to the screw mechanism for operating said screw mechanism, substantially as set forth.

2. The combination in a friction clutch, of a clutch member fixed to one shaft section, a second clutch member fixed to another shaft section, a portion of which second clutch member is longitudinally movable, friction surfaces on said clutch members, screw mechanism in said second clutch member to bring the friction surfaces of the clutch members into and out of contact, a sleeve rotatable with the shaft and also to a limited degree rotatable thereon and non-rotatable with relation to the screw mechanism, and means for moving said sleeve longitudinally on the shaft and simultaneously rotating it to a limited degree thereon, substantially as set forth.

3. The combination in a friction clutch, of a clutch member fixed to one shaft section, a second clutch member fixed to another shaft section, a section of which second clutch member is longitudinally movable, friction surfaces carried by both of said clutch members, means for adjusting said friction surfaces with relation to each other, screw mechanism in said second clutch member to move the friction surfaces on said second clutch member into and out of contact with the friction surfaces on the first named clutch member, and means for operating said screw mechanism, substantially as set forth.

4. The combination in a friction clutch of two clutch members, one of which is secured to a shaft section, an annular rim or shell on one side of said clutch member, a friction surface on said clutch member, a second clutch member mounted on another shaft-section, a movable section on said second clutch member, friction surfaces on the parts of said second clutch member, screw mechanism connecting the first and second sections of the second clutch member to bring the friction surfaces thereon into and out of contact with the friction surface on the first named clutch member, and means for operating said screw mechanism, substantially as set forth.

5. The combination in a friction clutch of two clutch members, one of which is secured to a shaft section, an annular rim or shell on one side of said clutch member, a friction surface on said clutch member, a second clutch member mounted on another shaft section, a movable section on said second clutch member, friction surfaces on said second clutch member adapted to contact with the friction surface on the first named clutch member, means connecting the fixed and movable parts of the second clutch member so they will rotate in unison, screw mechanism connecting the fixed and movable parts of the second clutch member to move the friction surfaces thereon into and out of contact with the friction surface of the first named clutch member, a sliding sleeve having a diagonal slot therein on the second shaft section, a stud on said shaft-section engaging said slot, means for connecting said sleeve with the movable parts of said second clutch member, and means for sliding said sleeve longitudinally on the shaft, substantially as set forth.

6. The combination in a friction clutch, of a clutch member secured to a shaft-section, an overhanging flange or rim thereon, splines on the inner face of said flange, radial friction rings engaging said splines, a second clutch member, a friction surface thereon to engage one side of the friction rings in the first clutch member, longitudinal splines on said second member, friction rings mounted thereon so as to be brought into contact with the friction rings on the first named clutch member; a longitudinally movable section mounted on the second clutch member, a friction surface thereon to contact with the opposite side of the friction rings on the first clutch member, screw mechanism to move the movable section of the second clutch member toward and away from the fixed section thereof, and means for operating said screw mechanism, substantially as set forth.

7. The combination in a friction clutch, of a clutch member secured to a shaft-section, an overhanging flange or rim thereon, longitudinal splines on the inner face of said flange, radial friction rings engaging said splines, a second clutch member, a friction surface thereon to engage one side of one of the friction rings in the first named clutch member, longitudinal splines on said second member, friction rings mounted thereon so as to be brought into contact with the friction rings on the first clutch member, a longitudinally movable section mounted on the second clutch member, a friction surface thereon to contact with the opposite side of the friction rings on the first clutch member, screw mechanism to move the movable section of the second clutch member toward and away from the fixed section thereof, a sleeve having a diagonal slot therein and slidable on the shaft within the movable part of the second clutch member for actuating the screw mechanism, a stud on the shaft engaging the slot in said sleeve, worm gear mechanism for adjusting said sleeve, and means for moving said sleeve longitudinally on the shaft, substantially as set forth.

In testimony whereof I affix my signature, in presence of two witnesses.

WILLIAM J. HILLIARD.

Witnesses:
H. M. STURGEON,
FRANK A. BLILEY.